United States Patent [19]

Stupek, Jr. et al.

[11] Patent Number: 5,809,287

[45] Date of Patent: *Sep. 15, 1998

[54] AUTOMATIC COMPUTER UPGRADING

[75] Inventors: Richard A. Stupek, Jr., Houston; David Scott Shaffer; Curtis R. Jones, both of Cypress; Steve Davis; William D. Justice, Jr., both of Houston, all of Tex.

[73] Assignee: Compaq Computer Corporation, Houston, Tex.

[*] Notice: The term of this patent shall not extend beyond the expiration date of Pat. No. 5,588,143.

[21] Appl. No.: 768,215

[22] Filed: Dec. 17, 1996

Related U.S. Application Data

[63] Continuation of Ser. No. 303,173, Sep. 8, 1994, Pat. No. 5,586,304, and Ser. No. 447,980, May 23, 1995, Pat. No. 5,588,143.

[51] Int. Cl.⁶ ........................................................ G06F 7/02
[52] U.S. Cl. .......................... 395/500; 395/712; 395/617
[58] Field of Search .................................. 395/500, 575, 395/600, 700; 340/825.22

[56] References Cited

U.S. PATENT DOCUMENTS

| 5,155,837 | 10/1992 | Liu et al. | 395/500 |
|---|---|---|---|
| 5,155,847 | 10/1992 | Kirouac et al. | 395/600 |
| 5,210,854 | 5/1993 | Beaverton et al. | 395/500 |
| 5,367,686 | 11/1994 | Fisher et al. | 395/700 |
| 5,418,524 | 5/1995 | Fennell | 340/825.22 |
| 5,421,006 | 5/1995 | Jablon et al. | 395/575 |
| 5,423,023 | 6/1995 | Batch et al. | 395/500 |
| 5,450,589 | 9/1995 | Maebayashi et al. | 395/700 |
| 5,485,601 | 1/1996 | Ching | 395/500 |

OTHER PUBLICATIONS

"NetWare in Practice: The Glue for Heterogeneous Systems Development", by Robert Campbell, IEE Colloq. No. 190: Industrial LANs for Management, 1992.

"NetWare Dynamic Data Echange", by D. Carstoiu et al., IEEE, Mediterranean Electrotechnical Conference, Jun. 1994, pp. 284–287.

"Novell NetWare Multimedia Communication System using Microsoft Windows", by E. Chung et al., IEEE System Theory, 1995 Southeastern Symposium, pp. 397–401.

"Novell®, Network Management Systems™: Managing Netware Servers", 18–Mar.–1993, Section 2–6.

"Netware Management", The Frye Utilities for Networks, 1994, p. 45.

"Network–Management Utilities", *PC Week*, 4–Oct.–1993, pp. N/39–N/44.

European Search Report dated 29–Jan.–1996.

"Electronic Software Distribution: Diamond in the Rough", by Salvatore Salamone, Data Communications, vol. 22, No. 4, Mar. 1993, New York, US.

"Packaging and Required Type Updates", IBM Technical Disclosure Bullentin vol. 35, No. 5, Oct. 1992.

*Primary Examiner*—Kevin J. Teska
*Assistant Examiner*—Russell W. Frejd
*Attorney, Agent, or Firm*—Sharp, Comfort & Merrett, P.C.

[57] ABSTRACT

A method for use in upgrading a resource of a computer from an existing version of the resource to a later version of the resource. The method includes the steps of (a) digitally storing upgrade information which identifies the later version and describes features of the later version relative to one or more earlier versions of the resource, (b) digitally storing in the computer information identifying the existing version, by computer, automatically determining which of the earlier versions is the existing version, and (c) based on the results of the comparing step, automatically determining, or displaying to a user at least some of the upgrade information to aid the user in determining, whether to perform an upgrade. The upgrade information may be stored on a portable medium along with copies of the resources and the upgrade information may include instructions, in accordance with a predefined common syntax, for installing each of the resources.

55 Claims, 15 Drawing Sheets

MIB 5

DRIVER TABLE 32

| DRIVER NAME READ/WRITE | VERSION | DATE | LOCATION |
|---|---|---|---|
| | 2.1 READ ONLY | 02/04/94 2:01AM READ ONLY | C:\WINTNT READ/WRITE |

JOB STATUS TABLE 34

| JOB NAME | SEND STATUS | EXECUTION TIME | EXECUTION STATUS |
|---|---|---|---|
| | PENDING SENDING COMPLETE ERROR | 01/01/95 12:00PM IMMEDIATE | PENDING RUNNING COMPLETE ERROR |

FIG. 4

PACKAGES.DB — 25

| | | |
|---|---|---|
| 25a — PACKAGE NUMBER | NUMBER | UNIQUE NUMBER FOR DATABASE |
| 25b — RECORD COUNTER | NUMBER | COUNT OF RECORDS FOR THIS PACKAGE |
| 25c — VERSION | ALPHANUMERIC(50) | VERSION STRING (e.g. 1.21) |
| 25d — DATE | DATE | DATE OF EXECUTABLE |
| 25e — PACKAGE NAME | ALPHANUMERIC(50) | NAME OF PACKAGE |
| 25f — PACKAGE PATH | ALPHANUMERIC(255) | PATH ON CD THAT CONTAINS THIS PACKAGE |
| 25g — PACKAGE SCRIPT | ALPHANUMERIC(255) | SCRIPT REQUIRED TO INSTALL THIS PACKAGE |
| 25h — CHILD DEPENDENCIES | NUMBER | OTHER PACKAGE LINK |
| 25i — PARENT DEPENDENCIES | NUMBER | OTHER PACKAGE LINK |
| 25j — SIBLING DEPENDENCIES | NUMBER | OTHER PACKAGE LINK |
| SELECTABLE FOR UPGRADE | NUMBER | CAN THE USER SELECT THIS PACKAGE FOR UPGRADING |
| VIEWABLE | NUMBER | IS THIS PACKAGE VIEWABLE BY THE USER |

FIG. 5A

DESCRIP.DB ~27

| | | |
|---|---|---|
| PACKAGE NUMBER | NUMBER | CORRESPONDS TO NUMBER IN PACKAGE db |
| COUNT | NUMBER | COUNT OF RECORDS FOR THIS PACKAGE |
| VERSION | ALPHANUMERIC(50) | VERSION STRING (e.g. 1.21) |
| DATE | DATE FIELD | DATE OF EXECUTABLE |
| DESCRIPTION | ALPHANUMERIC(255) | DESCRIPTION OF CHANGE BETWEEN THIS VERSION AND PREVIOUS VERSION |
| TYPE | NUMBER | TYPE OF CHANGE (e.g., BUG FIX) |
| IMPORTANCE | NUMBER | HIGH, MEDIUM, LOW |

27a — PACKAGE NUMBER
27b — COUNT
27c — VERSION
27d — DATE
27e — DESCRIPTION
27f — TYPE
27g — IMPORTANCE

FIG. 5B

HOWTO.DB 29

| | | |
|---|---|---|
| 29a — PACKAGE NUMBER | NUMBER | CORRESPONDS TO NUMBER IN PACKAGE db |
| 29b — MIB ITEM COUNT | NUMBER | RECORD NUMBER FOR THIS PACKAGE |
| 29c — INTERNAL NUMBER | NUMBER | UNIQUE NUMBER FOR MIB ITEM AND COMPARISON SERVICE |
| 29d — MIBNAME(S) | ALPHANUMERIC | NAMES(S) OF MIB ITEMS REQUIRED BY THE COMPARISON SERVICE |
| 29e — COMPARISON SERVICE | ALPHANUMERIC(255) | NAME OF SERVICE THAT WILL DO THE COMPARISON |
| 29f — STRING DATA TO COMPARE | ALPHANUMERIC(255) | OPTIONAL DATA PASSED TO COMPARISON SERVICE |
| 29g — NUMERIC DATA TO COMPARE | NUMBER | OPTIONAL DATA PASSED TO COMPARISON SERVICE |
| 29h — COMPARISON TYPE | NUMBER | TYPE OF COMPARISON: 1 -CHECK TO SEE IF THIS PACKAGE IS INSTALLABLE ON THIS SERVER. 2 -CHECK TO SEE IF THIS IS AN UPGRADE FROM THE CURRENT VERSION |
| 29i — COMPARISON GROUP | NUMBER | GROUPING INFORMATION |

FIG. 5C

AUTOMATIC COMPUTER UPGRADING

This is a continuation of application Ser. No. 08/303,173, filed Sep. 8, 1994, now U.S. Pat. No. 5,586,304 and a continuation of application Ser. No. 08/447,980, filed on May 23, 1995, now U.S. Pat. No. 5,588,143.

BACKGROUND

This invention relates to automatic computer upgrading.

The user of a computer system (e.g., a stand-alone PC or a network) is usually concerned with maintaining maximum utility and efficiency of system resources while at the same time minimizing the cost, in time, money and frustration, of maintaining the system. System resources, e.g., system firmware, software applications, operating systems (OS), OS drivers and system partition utilities, are frequently upgraded by the manufacturer. Therefore, to effectively balance system utility with the costs of the system, the user frequently would have to perform a detailed analysis of the available upgrades and the effect those upgrades would have on the user's system.

During such an analysis, the user would have to compare the version number of each system resource to that of its upgrade to determine whether or not an upgrade is available. When an upgrade is available, the user would have to understand the differences between the system version of the resource and the corresponding upgrade, as well as how these differences would affect (i.e., improve or diminish) the capabilities of the computer system.

Even when the user is able to determine with accuracy the benefits of an upgrade to the system, the user is almost never able to determine how an upgrade will impact a resource that is not upgraded. It is not uncommon for an upgrade to reduce the ability of a resource to properly function with another resource. In addition, upgrades often exist solely to repair hidden bugs which may not have surfaced on the user's system, a situation in which the user almost always ignores the upgrade until the bug is encountered, usually resulting in lost information.

Many resource manufacturers address some of these problems by making certain aspects of the upgrade determination easier for the user. The NetWare Management System by Novell inspects network loadable modules (NLMs) on a network server to determine the current version of the NLM, its most recent revision level, and the revision date. Thus, NMS not only tells the user which resources are currently on the system, but also provides information that allows the user to easily determine whether or not upgrades are available. Likewise, the Frye Utilities NetWare Management program provides the titles and version numbers of NLMs on the server. Manufacturers also usually provide descriptions of the changes made from one version of a resource to the next. Nevertheless, despite the availability of this type of information, the user, in general, either never upgrades or upgrades whether it is needed or not.

SUMMARY

In general, in one aspect, the invention features a method for use in upgrading a resource of a computer from an existing version of the resource to a later version of the resource. The method includes the steps of (a) digitally storing upgrade information which identifies the later version and describes features of the later version relative to one or more earlier versions of the resource, (b) digitally storing in the computer information identifying the existing version, by computer, automatically determining which of the earlier versions is the existing version, and (c) based on the results of the comparing step, automatically determining, or displaying to a user at least some of the upgrade information to aid the user in determining, whether to perform an upgrade.

Implementations of the invention include the following features. The upgrade information may be stored on a portable medium, the later version of the resource may also be stored on the portable medium, and the upgrade information may identify the location of the resource on the portable medium. The portable medium may be a CD-ROM, and may contain stored later versions of multiple resources, and upgrade information with respect to each of the resources.

The upgrade information may be stored in the form of a database, and may include instructions for installation of the resource. The installation instructions may be expressed in accordance with a predefined common syntax. The resource may include a complete standalone software package, or less than all of a complete standalone software package.

The upgrade may be automatically performed on a network server, or on a network client. In the latter case the upgrade may be performed via the network, or by automatically storing the later versions and installation instructions on a portable storage medium for manual installation on the client.

The upgrade information may include information concerning reasons for the later version, and an indication of the type of change from a prior version to the later version (e.g., feature enhancement, performance enhancement, or bug fix). The upgrade information also may include an indication of the importance of the change from the prior version to the later version, and information identifying other resources that must be upgraded before the resource may be upgraded.

In general, in another aspect, the invention features supplying later versions of resources for upgrading existing versions, by storing copies of the resources and upgrade information which identifies the later versions, describes features of the later versions relative to one or more earlier versions of the resource, and provides instructions, in accordance with a predefined common syntax, for installing each of the resources. The copies of the resources and the upgrade information may be stored on a portable storage medium or within an on-line service.

Among the advantages of the invention are the following. The invention automatically determines the availability of upgrades to resources on a computer system. The invention may also determine the importance of each of the upgrades. In addition, information regarding dependencies between upgrades is provided. As a result, the user can, with little effort, make an educated determination of which resources should and should not be upgraded at a particular time. Resources to be upgraded may be selected automatically, and the upgrades may be made automatically in a network environment or manually using automatically generated upgrade diskettes.

Other advantages and features will become apparent from the following description and from the claims.

DESCRIPTION

FIG. 4 is a diagram of components of a management information base.

FIGS. 5A–5C are templates for records in an upgrade database.

Figure 1:
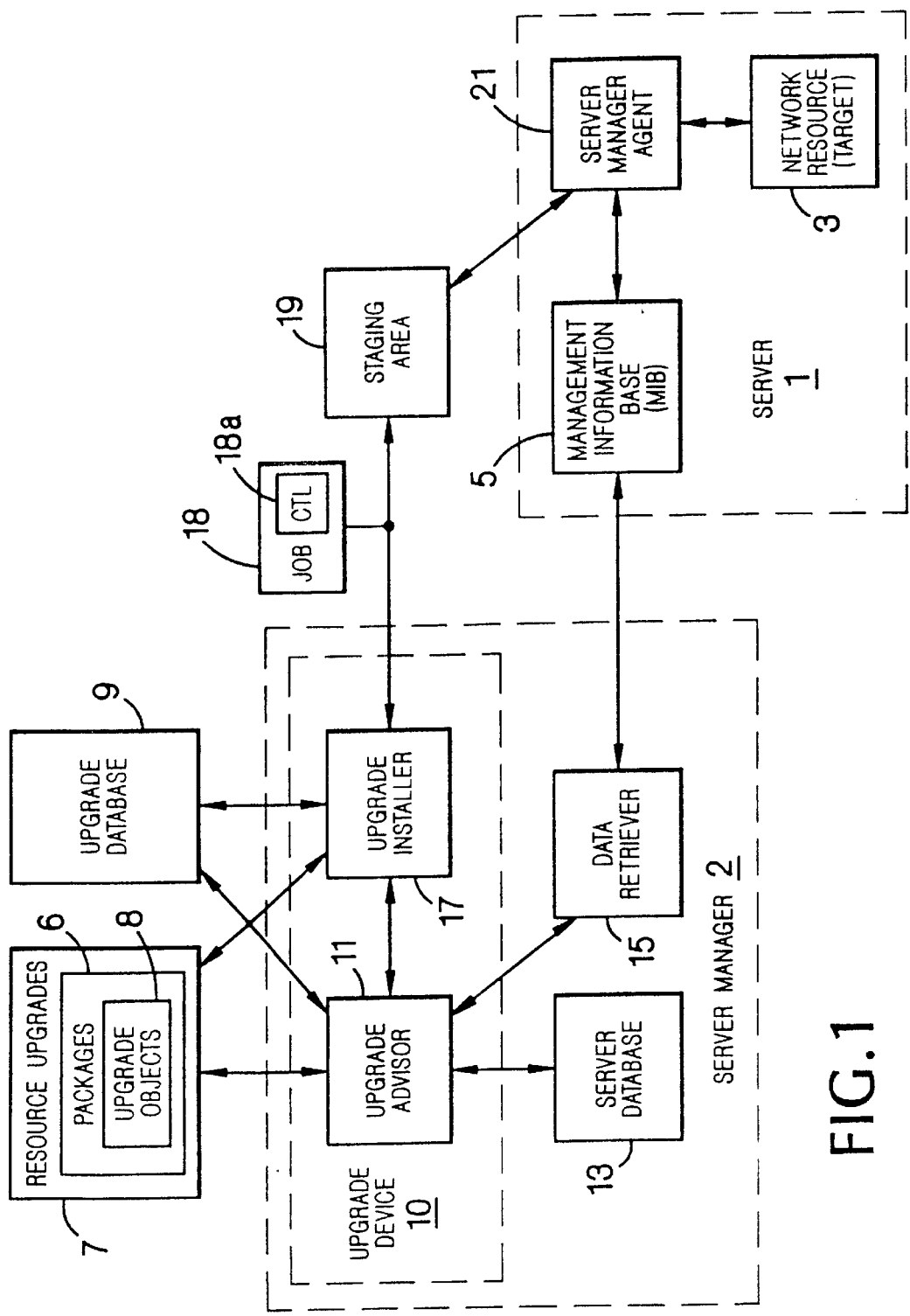
FIG. 1 is a functional block diagram of a network server and a server manager, including an automatic upgrade device.

Referring to FIG. 1, a network server 1 provides network resources 3 to a network of client computers (not shown). Network resources include firmware, software applications, operating systems (OS), OS drivers and hardware drivers. A management information base (MIB) 5 within the server 1 maintains basic descriptive information about each of the resources 3 available on the server 1. Included in the MIB 5 are the name and version number of each piece of software, its location in the server, and the date and time of its release. The information in the MIB 5 ensures that the server 1 always has a current record of the resources 3 it provides to the network.

Upgrades 7 to the network resources 3 are provided to a server manager 2 by a distribution medium (not shown), such as a CD-ROM. The upgrades 7 may also be provided by an on-line service (not shown), such as a bulletin board service administered by a manufacturer of network resources. The basic units of the upgrades 7 are upgrade objects 8, each of which corresponds to an individually upgradable network resource 3. The upgrade objects are grouped into upgrade packages 6 which correspond to resource 3 groupings on the server. A package 6 may contain any number of upgrade objects 8 (i.e., may upgrade any number of individual network resources 3), including only a single object 8.

In addition to the resource upgrades 7, the CD-ROM contains an upgrade database 9, which stores information about each of the upgrade packages 6 (e.g., name and location of the package on the CD-ROM, description of the upgrades, and instructions for installation of the package to the server), and the individual upgrade objects 8 within each package 6. If the upgrades 7 are provided by an on-line service, the upgrade database 9 will also be provided by the service.

The server manager 2 oversees the network resources 3 stored on the server 1. An upgrade device 10 in the server manager 2 is responsible for automatically analyzing and executing the resource upgrades 7 available to the server 1. When the upgrades 7 become available to the network (e.g., by inserting the CD-ROM into the server manager drive, or by logging into the on-line service), an upgrade advisor 11 in the upgrade device 10 automatically analyzes each network resource 3 currently on the server 1 to determine the availability and necessity of the corresponding upgrade 7. When the analysis is complete, the upgrade advisor 11 presents a report and/or graphical display to the user. This output is in the form of upgrade recommendations, each supported by an explanation of the reasons for upgrade. The results may also be used to create upgrade diskettes.

To determine which upgrades 7 should be installed to the server, the upgrade advisor 11 retrieves information about the MIB 5 from a server database 13 located in the server manager. The server database 13 tells the upgrade advisor 11 the location of each piece of information contained in the MIB. The upgrade advisor 11 supplies the location information to a data retriever 15, which uses it to retrieve from the MIB 5 data (MIB data) about the network resources 3. The upgrade advisor 11 then retrieves upgrade information from the upgrade database 9 and performs two types of comparisons: a) whether or not a particular upgrade package corresponds to a resource on the server, and b) whether or not the version number of the upgrade package matches the version number of the corresponding network resource (i.e. whether or not the upgrade package represents a true upgrade for the existing network resource). If the upgrade applies to a resource on the server and if the upgraded and current versions of the network resource do not match, the upgrade advisor 11 uses additional information from the upgrade database 9 to analyze the level of severity of the upgrade, i.e., to determine the importance of the upgrade to the efficient operation of the server. The upgrade advisor is described in more detail below.

Figure 2:
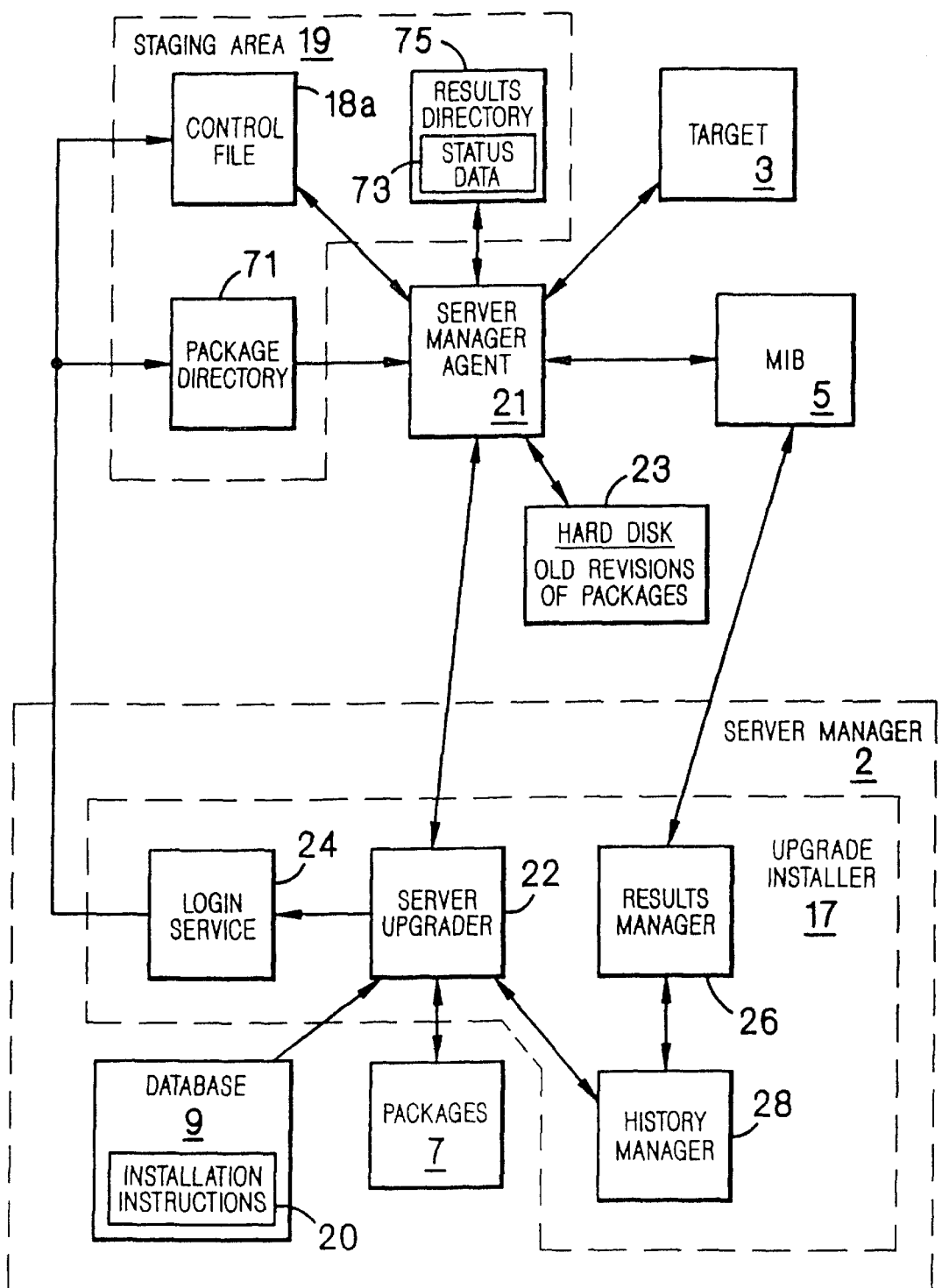
FIG. 2 is a functional block diagram of a server and a server manager during an automatic upgrade.
Figure 3:
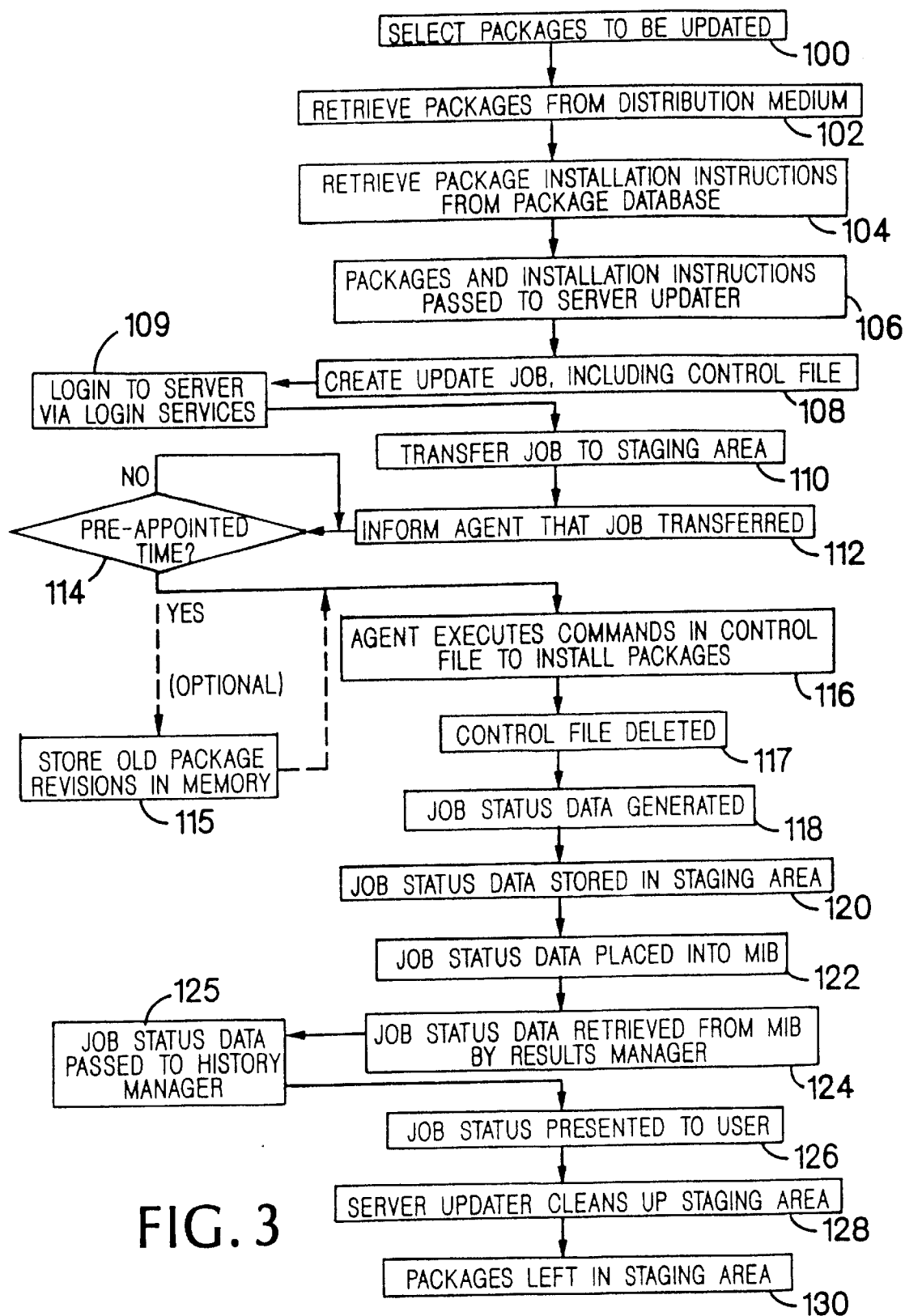
FIG. 3 is a flow diagram for automatically updating resources on a network server.

Referring also to FIGS. 2 through 4, the upgrade database may also contain information about a resource (e.g., a driver) which is not recognized by the server manager. In this situation, the upgrade advisor places information about the resource (e.g., name, version number) into a driver table 32 in the MIB 5. An agent 21 of the server manager located in the server uses this information to search for the resource (i.e., to see if the resource has been installed on the network). If so, the server manager creates entries for the resource in the server database.

When the upgrade advisor 11 and/or the user have elected 100 the network resources 3 that need to be upgraded, an upgrade installer 17 oversees the automatic installation of the packages to the server. At the outset, the appropriate upgrade packages 7 are retrieved 102 from the distribution medium (or the on-line service) and supplied 106 to a server upgrader 22 located in the upgrade installer 17. Installation instructions 20 are retrieved 104 from the database 9 and are supplied 106 to the server upgrader 22. The instructions are coded in a unique package scripting language (PSL), which can be read and executed at the time of installation. Rules of syntax for a preferred PSL are listed in the table below.

PACKAGE SCRIPT LANGUAGE

A package Script Language (PSL) is defined that should make it easier for package owners to develop installation scripts for their products.

Commands

The installer will look for a .PSL file and begin executing it. PSL commands are:

MKDIR [/err] <directory>

COPY [/u] [/err] <source> <destination>

DELETE [/err] <source> <destination>

RUN_[os] [/err] <executable> [ . . . parameter list . . . ]

Where,

/u—add the opposite of this command (or copy <destination> <source>) to the UNDO.PSL file (see below)

/err—on error, stop script processing and report a package failed status (run undo.psl and report failed in job status table).)

<source>—source file to copy—can be any number of specifications:

d: [\directory\]<filename>
\\server\share\[directory]<filename>
SYSPART: [\directory\]<filename>
<destination>—destination for file—see specs for <x>
os—defined as NT (WinNT), 02 (OS/2), SC (SCO UNIX), UW (UnixWare), and NW (NetWare).

For COPY, any file attributes will be preserved but ignored (i.e., copying over a ReadOnly doesn't case an error).

SECTION HEADLINES

Each PSL is broken into sections designated by a section heading. There are four special section heading names that the script processor will look to execute. The headings are executed in this order: Main, EISA ID, OS, and User Defined.

[Main]—section is run on all machines

[EISA:eisaID]—section is executed if board with ID specified is installed. EISA ID is specified: CPQXXX where X can be an alphanumeric character or "?" to match any alphanumeric in that position.

[WinNT I Netware I UNIX I OS/2]—section should be run on machine if specified OS is running.

[<user defined>]—a user defined section. It must be immediately followed by:

DISCOVER_[os]=<executable>—executable should return 1 for execute remainder of section, or 0 for skip section. OS is defined as NT (WinNT), 02 (OS/2), SC (SCO UNIX), UW (UnixWare), and NW (NetWare).

[UNDO_BEG]—this section defines the <undo>.PSL file. The presence of this section causes the interpreter to create an <undo>.PSL file based on the naming. The [undo] section contains:

filename=<undo>.psl—or the name of the undo file to be created,

<any other text>—this text is added to the undo file untouched,

[UNDO_BEG]—the end of the undo section.

In the server upgrader 22, several upgrade packages 7 and the corresponding installation instructions 20 are grouped 108 into a "job" 18. Within each job 18, the installation instructions for every package are included in a control file 18a. The control file also includes a pre-appointed time at which the installation of the packages in the job should be carried out.

When the job 18 is ready to be installed to the target server, the server upgrader 22 connects 109 with the server through a login service 24 and then sends 110 the job 18, including the control file 18a, to a staging area 19. The staging area 19 may be in the target server, in the server manager, or anywhere else in the network capable of handling the deposit and retrieval of upgrade files. Within the staging area 19, each package is placed into a corresponding package directory 71, and the control file is stored separately. The server manager then notifies 112 the agent 21 that a job has been sent to the staging area 19. When the pre-appointed time arrives 114, the agent 21 executes 116 the instructions in the control file, thereby installing the packages from the package directories 71 to the target network resources 3. The agent then deletes 117 the control file from the staging area 19.

Before the packages are installed to the targets, the agent 21 may store 115 the older revision levels of the resources on a local hard disk 23. As a result, the user always has access to previous versions of the resources. Maintaining old versions of upgraded resources allows the user to downgrade the resource, if needed, in the future.

After the installation is complete, job status data 73 is generated 118 and temporarily stored 120 in a results directory 75 in the staging area 19. The agent 21 retrieves the job status data 73 from the results directory 75 and places 122 it into a job status table 34 in the MIB 5. A results manager 26 in the upgrade installer monitors the MIB 5 for the job status data 73 and retrieves 124 the data as soon as it appears. The results manager 26 then sends 125 the data to a history manager 28, which tracks the history of upgrades on the server. The history manager 28 is responsible for providing 126 the history information to the user (or to storage). The server upgrader 22 then cleans 128 the staging area of any extraneous information. Because a single copy of a package may be used to upgrade a resource on multiple servers (using multiple control files), the packages are left 130 in the staging area 19 by the server upgrader.

Referring to FIGS. 5A through 5C, the upgrade database actually consists of three databases: a "Package" database 25, a "Description" database 27, and a "How_To" database 29. The Package database 25 contains the information which associates upgrade objects with each package, as well as the information needed to retrieve a package from the distribution medium (CD-ROM) and properly install the package to the server. For each upgrade package, the database maintains a unique package number 25a and a count 25b of the number of database records (i.e., upgrade objects) associated with the package. In addition, the version number 25c and the upgrade date 25d of the package are maintained. The Package database also maintains the name 25e of the package and the location 25f of the package on the CD-ROM (i.e., CD drive and directory name). To enable automatic installation of the package, the database contains the package script 25g (the installation instructions for the package). The database also contains information regarding the dependencies between the package and other upgrade objects or packages: child dependencies 25h are the upgrade objects associated with a package; sibling dependencies 25j are the packages upon which a package depends; and parent dependencies 25i are the packages or upgrade objects which together constitute a larger package. Finally, the database indicates whether or not the package can be selected by the user for upgrade and whether or not the package can be displayed to the user through a user interface.

While each upgrade distribution medium will commonly contain all upgrade packages upon which a particular upgrade depends, it is also likely that upgrades to a package will depend upon upgraded packages not stored on the distribution medium. For example, the printing capabilities of an upgraded word processor created by one vendor may depend upon an upgrade to a printer driver produced by another vendor. While it is unlikely that the word processor upgrade and the driver upgrade will be distributed on the same CD, the user should still be informed of the dependency. Therefore, the dependency information in the package database 25 describes not only the dependencies between packages on the CD, but also all dependencies between an upgrade package and any upgrade not available on the CD. Even though the unavailable upgrades cannot be automatically installed with the available upgrades, the user is nonetheless aware of their necessity.

The Description database 27 stores information that describes each upgrade found in a package. Included in this information are the package number 27a and record count 27b, as well as the version number 27c and date 27d of the upgrade. A description 27e of the change between the updated version and the previous version of the upgrade object is also provided. Because a server may contain any previous version of a resource, the database must maintain a description of the changes between each version. The description 27e includes reasons why the upgrade is necessary, drawing information from development release notes, test reports and field service reports. The type 27f of upgrade made to the object (e.g., feature enhancements, performance enhancements or bug fixes) and the importance 27g of the upgrade (e.g., high, medium or low) are also indicated in the Description database.

The How_To database 29 supplies information which allows the upgrade advisor to compare the upgrade information to the MIB data (MIB items) from the server. As in the Package and Description databases, the package number 29a is maintained. Within the How_To database, each record represents an individual piece of MIB information corresponding to the particular package. Each record is identified by a record number 29b. A unique internal number 29c is assigned to allow the upgrade device to identify the MIB item and comparison service specified in the record. The database also maintains the name 29d of the MIB item maintained in the record, as well as the name 29e of the comparison service which will use the MIB item to perform the comparison.

The items to be compared may be string data 29f (e.g., the name of the package) or numeric data 29g, and the comparison service is selected accordingly. The comparison service is also selected according to the type 29h of comparison, i.e., a) whether the package applies to the server, or b) whether the upgraded version differs from the current version. The comparison group number 29i allows the upgrade advisor to group comparison results with related results.

Figure 5D:
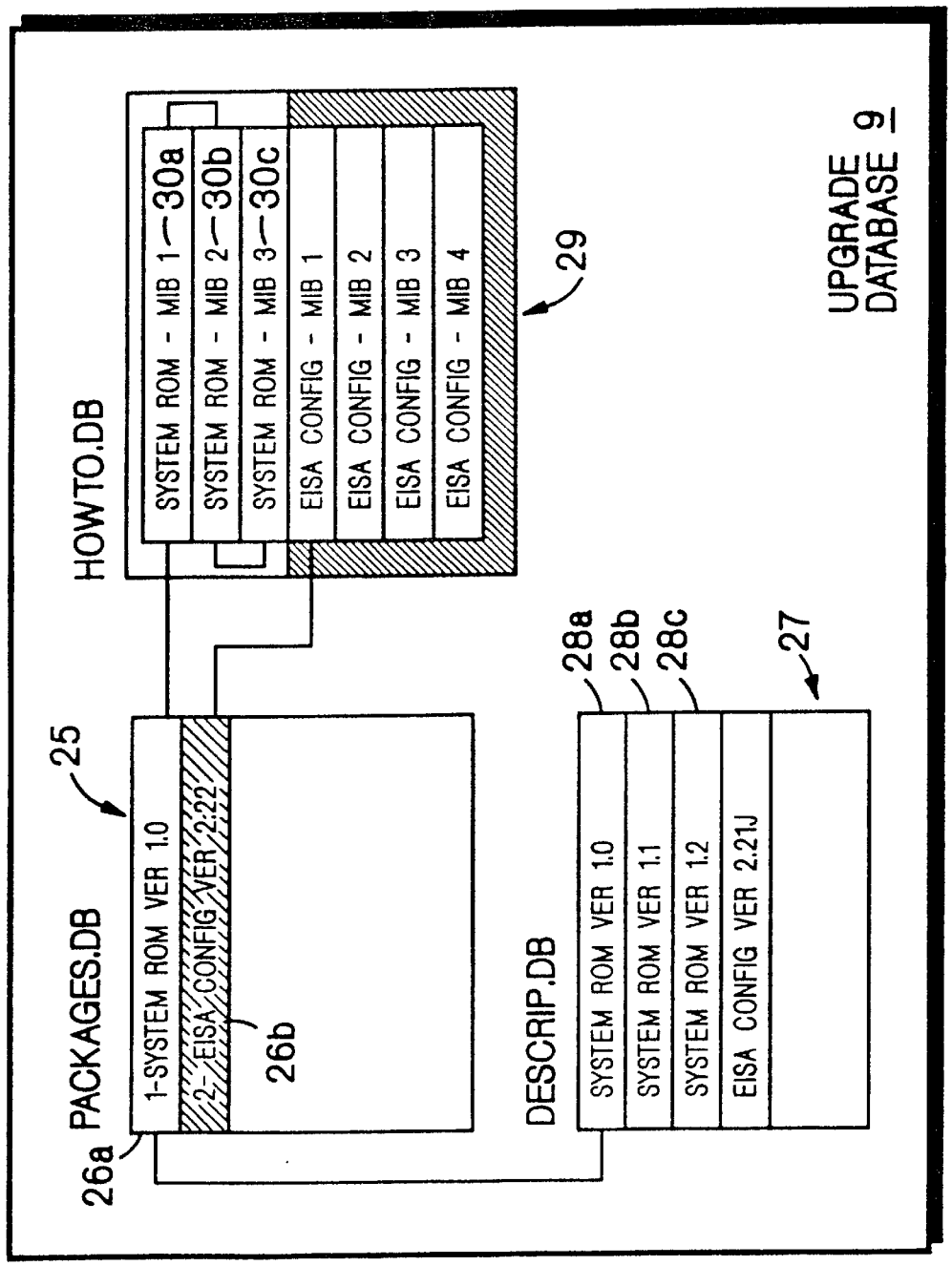
FIG. 5D is a functional block diagram of components of an upgrade database.
Figure 6:
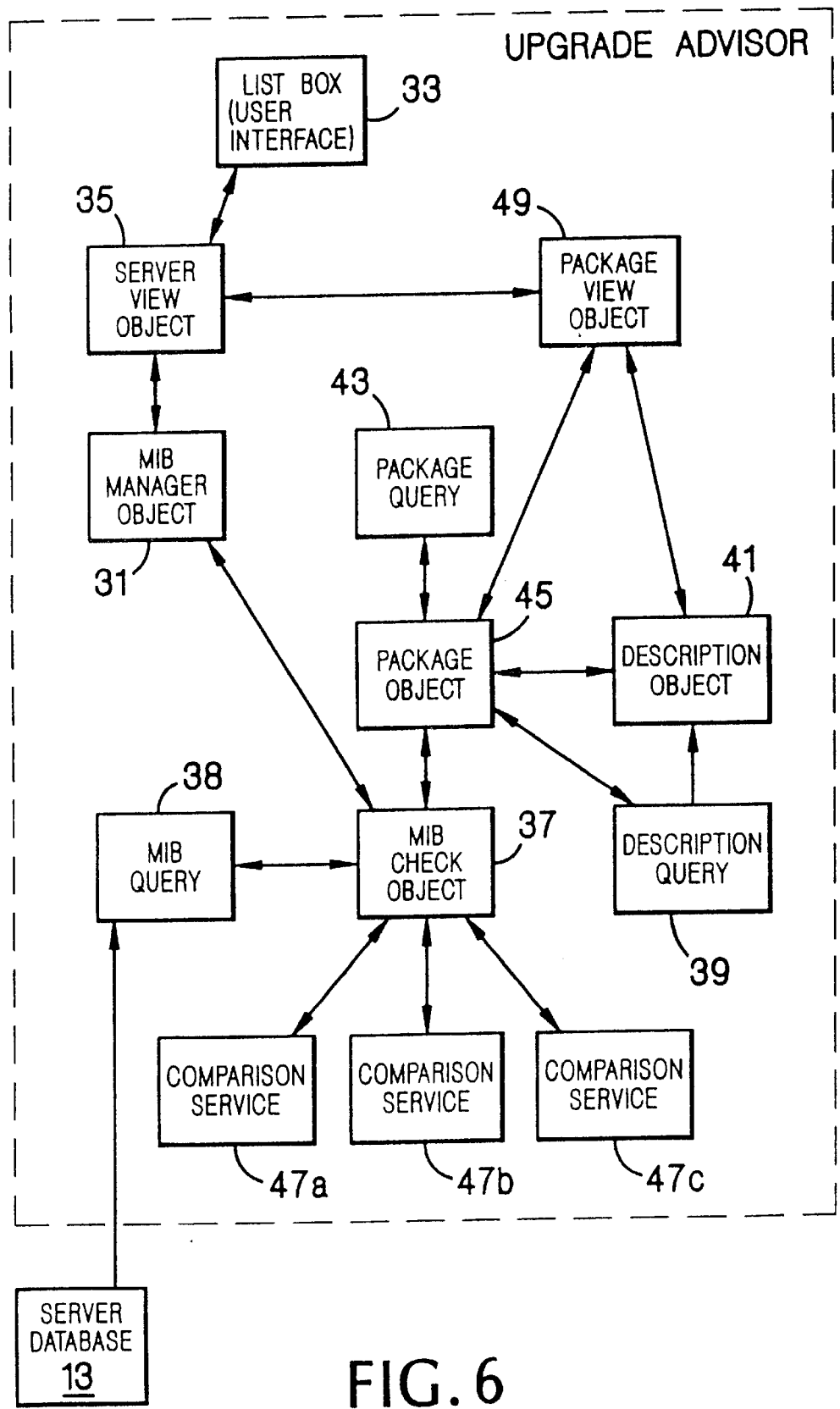
FIG. 6 is a functional block diagram of an upgrade advisor.
Figure 7A:
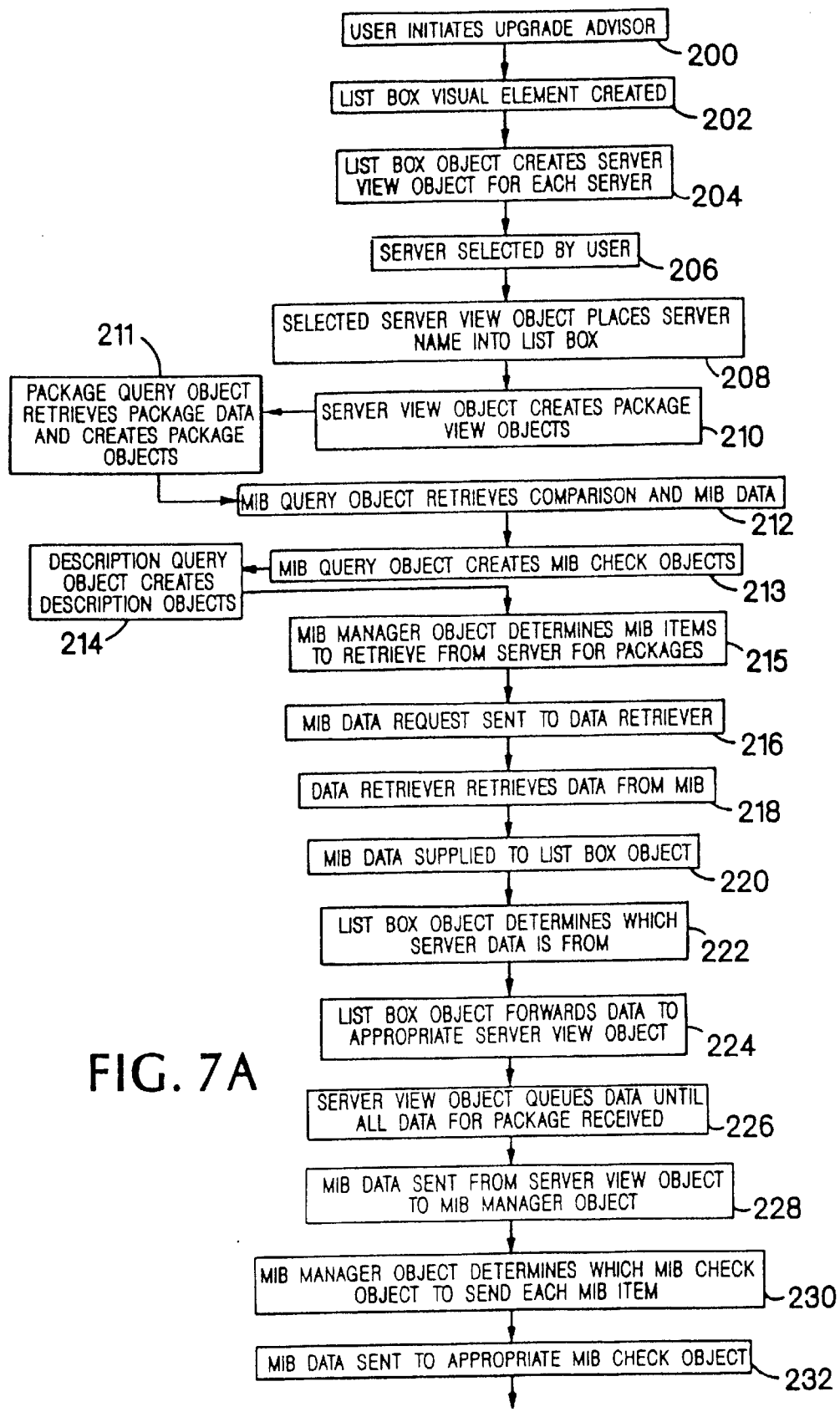
FIGS. 7A–7B and 8 are flow diagrams for upgrade advising.
Figure 7B:
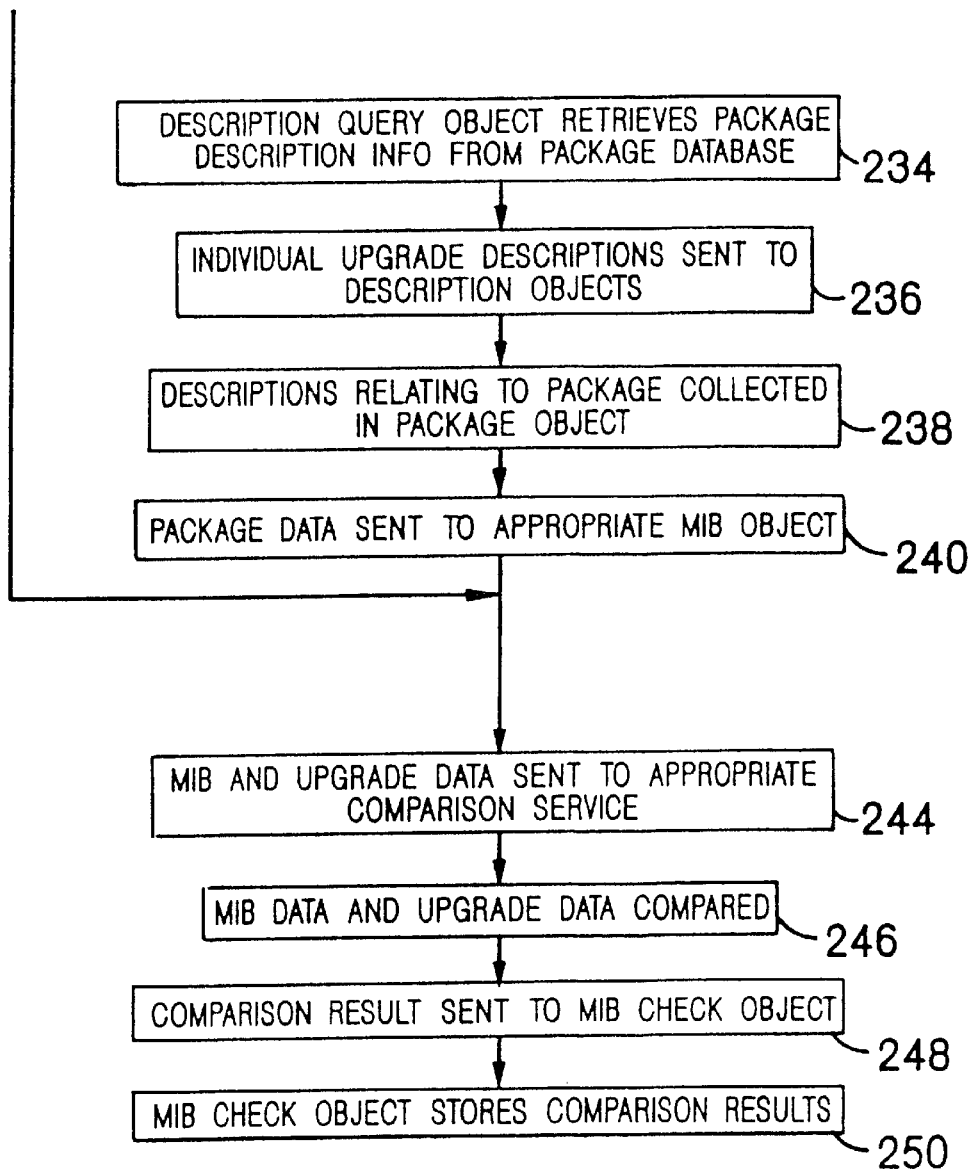
Figure 8:
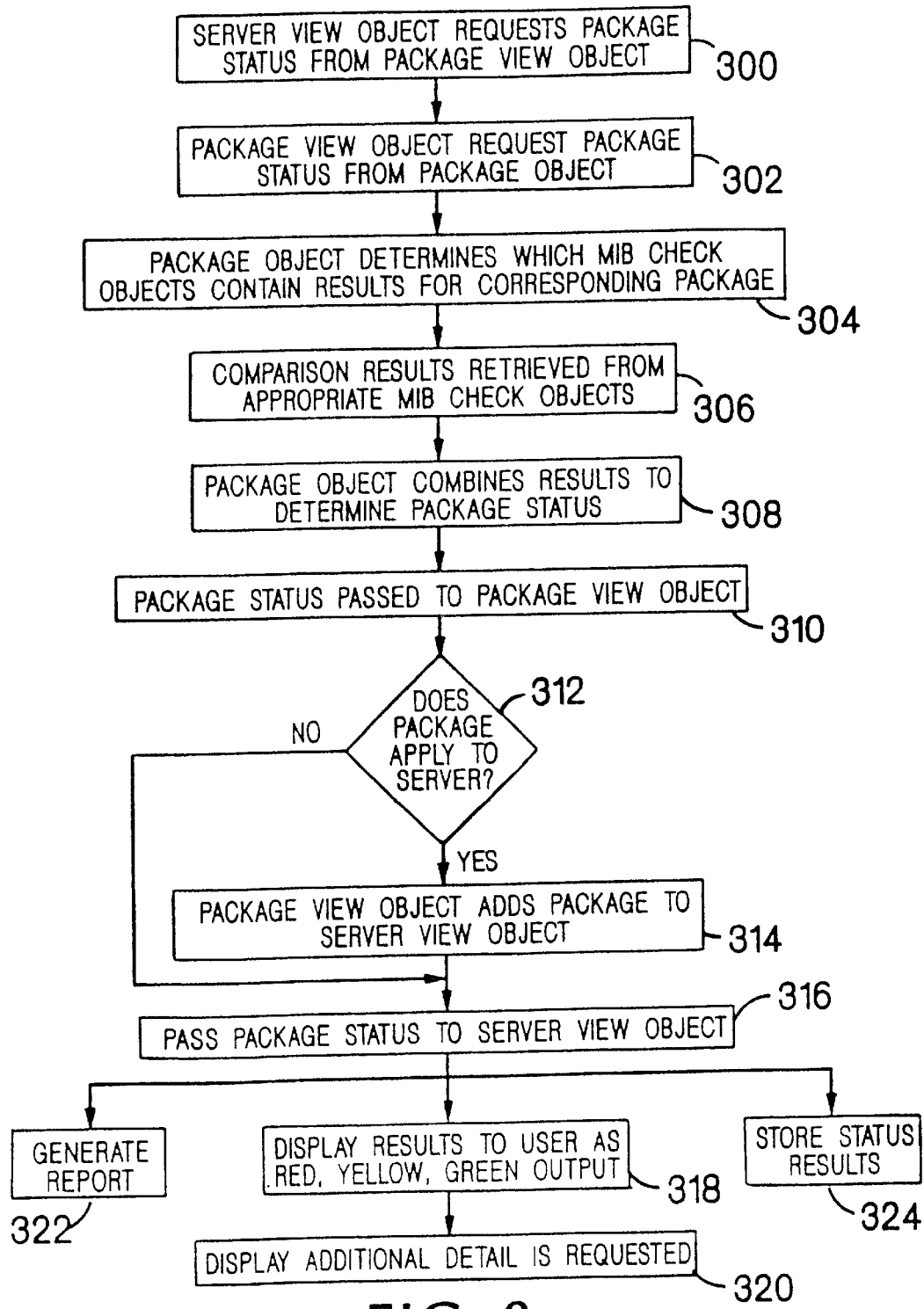
Figure 9:
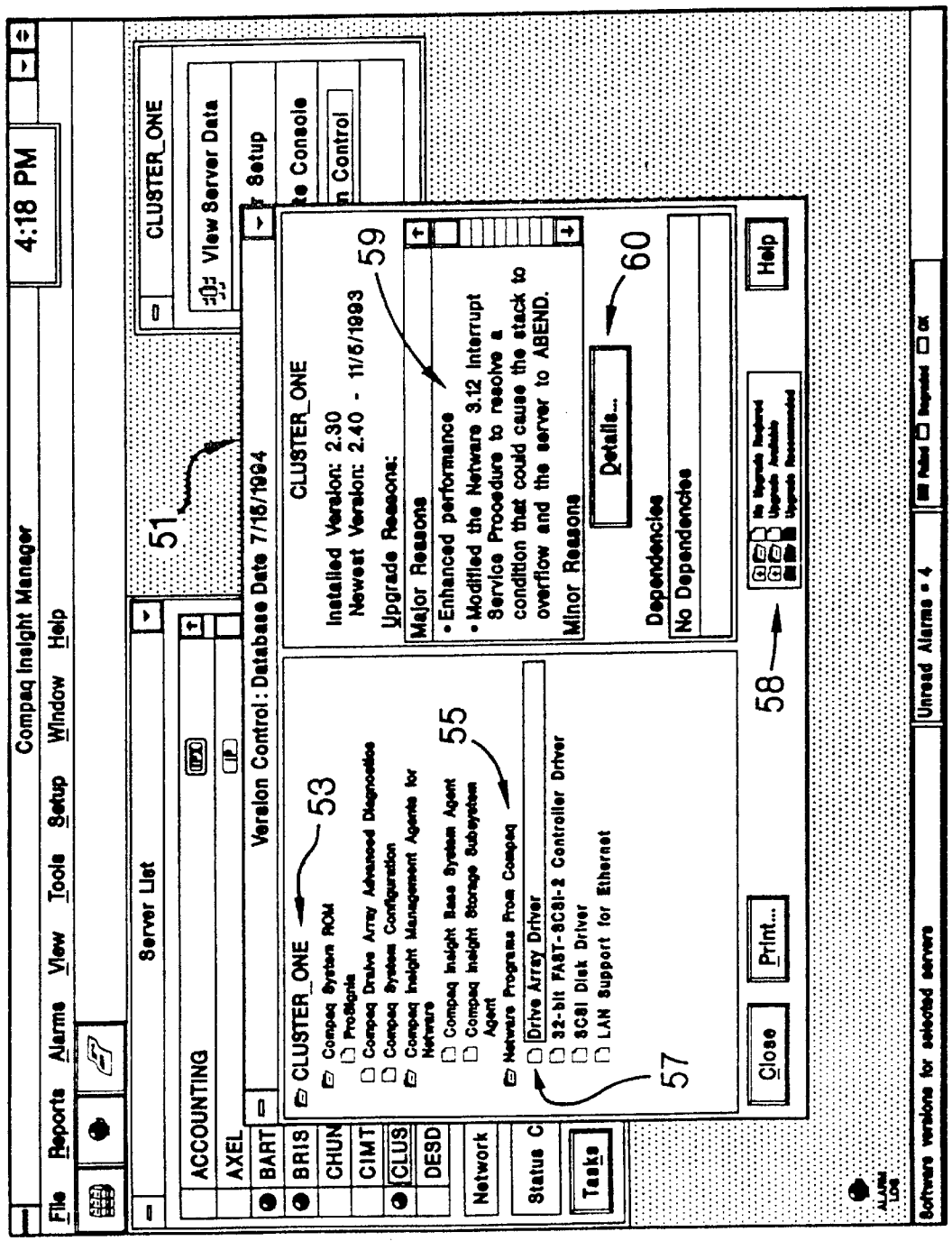
FIGS. 9 and 10 are screen shots of a graphical user interface for an upgrade advisor.
Figure 10:
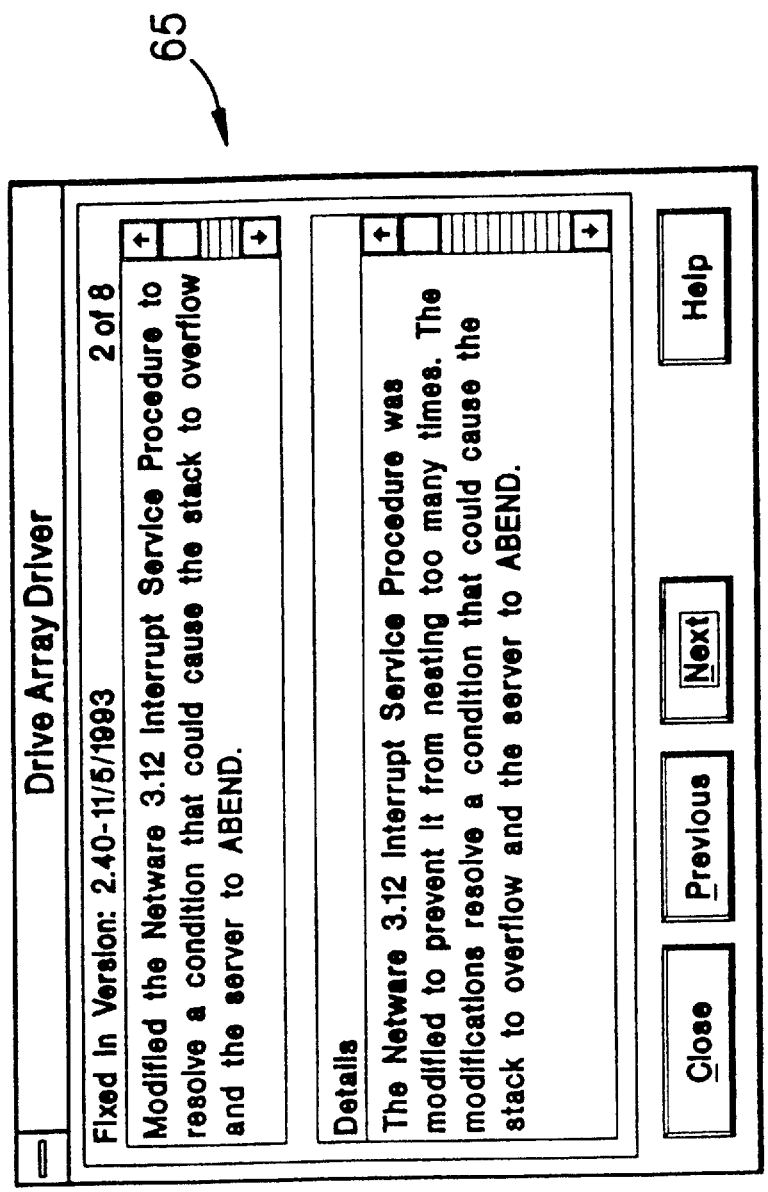

Referring also to FIG. 5D, the first package 26a in the Package database 25 is linked to description records 28a, 28b, 28c in the Description database 27. In this case, the description records corresponding to the package 26a provide detail on earlier versions of the package, thus enabling the upgrade advisor to analyze the changes between each version. The package 26a is also linked to the comparison records 30a, 30b, 30c in the How_To database 29, each of which describes the MIB data required to compare the current version of the package to the upgrade. The second package 26b and subsequent packages in the Package database are likewise linked to the corresponding records in the Description and How_To databases.

Referring to FIGS. 6 through 10, when the user initiates 200 the upgrade advisor, a list box object 33 is created 202, and a Windows list box 51 is displayed to the user. The list box object 33 creates 204 a server view object 35 for each server in the network. When a server is selected 206 by the user, the corresponding server view object 35 places 208 the server name 53 into the list box 51. The server view object 35 then creates 210 package view objects 49 to handle package information during the comparison process.

A package query object 43 retrieves 211 package data from the Package database and uses the data to create a package object 45 for each package. The package object is responsible for collecting information about the corresponding package, including a description of the package, pointers to the MIB check objects 37 that apply to the package, and pointers to parent, child, and sibling packages. A MIB query object 38 retrieves MIB location information for each MIB item from the server database 13 and then uses the information to retrieve 212 MIB data and comparison service information from the server. Comparison service information identifies the appropriate service to handle the comparison of each piece of MIB data. The MIB query object then creates 213 MIB check objects 37 responsible for handling the comparisons between MIB data and upgrade data. A description query object 39 uses information from the Description database to create 214 a description object 41 for each upgrade object contained in a package.

When all of the objects are created, a MIB manager object 31 determines 215 which MIB items should be retrieved from the selected server. A request for the MIB data is sent 216 to the data retriever (15 in FIG. 1), which gathers 218 the requested information from the MIB in the selected server and forwards 220 the data to the list box object 33. As the MIB items are received by the upgrade advisor, the list box object 33 identifies 222 the server which sent the data and forwards 224 the data to the appropriate server view object 35, where the MIB items are queued 226. When all items have been received from the server, the server view object 35 sends 228 the MIB data to the MIB manager object 31. The MIB manager object then identifies 230 the appropriate MIB check object 37 to process each piece of MIB data and distributes 232 the data accordingly.

As the MIB data makes its way from the server to the MIB check object, the corresponding upgrade description information is retrieved 234 from the Description database by the description query object 39. Each upgrade description is then forwarded 236 to the corresponding description object 41. From the description objects 41, each package object 45 collects 238 the upgrade descriptions pertaining to the package. The package object 45 then sends 240 each piece of upgrade data to the appropriate NIB check object 37 for comparison to corresponding MIB data.

Once the MIB check objects 37 have received the appropriate MIB data and upgrade data, the data is sent 244 to the appropriate comparison service 47, according to the comparison information retrieved from the MIB. After the data is compared 246, the comparison service 47 returns 248 a comparison result to the MIB check object, where the result is stored 250.

In order to display or report upgrade advice to the user, the server view object 35 requests 300 package status information from the package view object 49. The package view object 49 in turn requests 302 the status information from the package object 45. Using pointers, the package object 45 determines 304 which MIB check objects 37 contain the comparison results for the corresponding package. The package object then retrieves 306 the results and combines 308 them to determine package status (i.e., whether or not the package applies to the server, and whether the package needs to be upgraded on the server). Once the status of the package is determined, the package status information is passed 310 to the package view object 49. If the status information indicates that the package applies 312 to the server, the package view object adds 314 the package 55 to the server 53 in the list box 51. The status information is then passed 316 to the server view object 35, where it is displayed 318 to the user in the list box 51.

The importance of an upgrade 57 (high, medium, low) is displayed to the user through color coded vidual objects 58 (e.g., red, yellow, green). The reasons 59 for the upgrade (i.e, upgrade description) are also displayed in the list box 51. When requested by the user (e.g., with a "Details" button 60), additional details about the upgrade are displayed 320 in a detail window 65. In addition to displaying the output of the upgrade advisor, a report may be generated 322 by the upgrade advisor. The upgrade advisor may also store 324 the status results.

Figure 11:
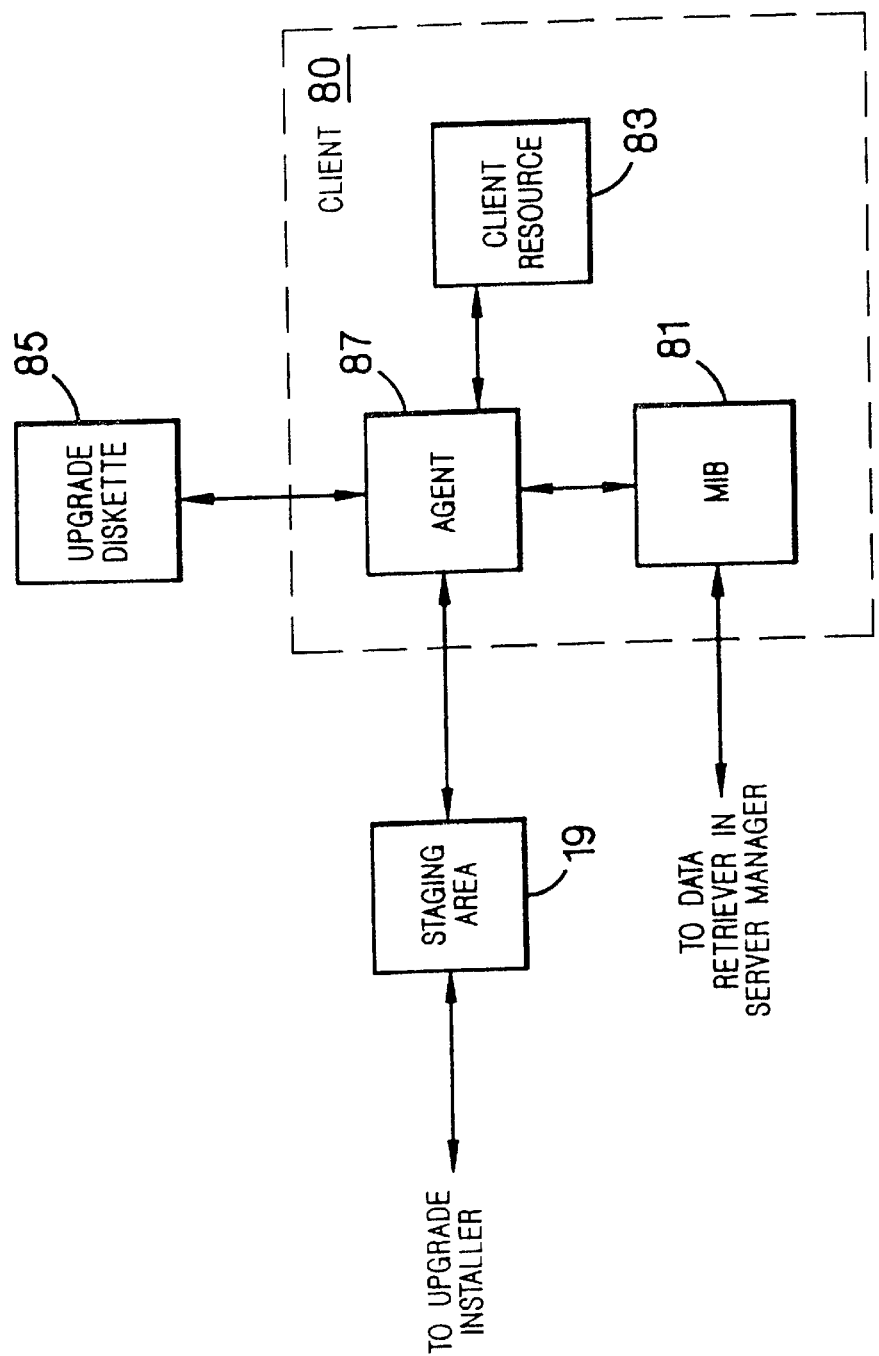
FIG. 11 is a functional block diagram of components of a client of the network server.

Referring to FIG. 11, the upgrade advisor and installer may also be used to analyze the availability of upgrades and generate upgrade jobs for individual clients 80 connected to the server. In this situation, the client, like the server, contains a MIB 81 which maintains information about the resources 83 currently installed on the client. When the user invokes the upgrade advisor, the MIB data is retrieved from the MIB 81 and the comparisons are carried out as described above.

The client resources 83 may then be upgraded in two ways: automatically through the upgrade installer, or manually with upgrade diskettes 85 automatically created by the upgrade device. If automatic update is chosen, the upgrade installer builds the selected upgrade packages and installation instructions into a job (as discussed above), which is transferred into a staging area. An agent 87 in he client 80 is then notified that a job has been placed in the staging area, and the agent installs the packages in the job according to the installation instructions. Alternatively, the client may be programmed to search the staging area at specific times (e.g., start-up) for jobs it needs to install.

If manual update is chosen, the packages selected for upgrade are stored to a diskette 85, along with the corresponding installation instructions. When all of the packages have been placed onto the diskette, the user places the diskette into a disk drive (not shown) on the client, and the agent automatically installs the packages according to the installation instructions.

As an example of the operation of the upgrade advisor and upgrade installer, assume that the distribution medium contains an upgrade package called Novell Programs. Within the Novell Programs package is an upgrade object corresponding to each of the NetWare drivers installed to the target server. When the distribution medium is inserted into the drive, the upgrade advisor reads information about the Novell Programs package from the Package database. The upgrade advisor then retrieves from the Description database description information for the upgrade objects in the package. The records corresponding to each upgrade object are then read from the How_To database and compared to the description information.

As shown in the chart below, the first record for the Novell Programs package contains information about the operating system running on the server. The first entry in the record is the name ("cpqHoName") of the MIB data for the records. This entry causes the upgrade advisor to retrieve he name of the operating system that the server is running. The second entry informs the upgrade advisor that a "stringcompare" comparison service will be used to compare the upgrade and MIB data. The third and fourth entries pass the corresponding description information to the comparison service. For record number 1, the MIB data is compared to the string "NetWare". Since string data is to be compared, the "numeric data" entry is ignored. The last entry for the record informs the upgrade advisor that the type of comparison to be performed is a determination of whether or not the NetWare OS applies to the server, i.e., if the OS runs on the server.

The second record contains the information necessary to determine whether or not the netware "NPFC" software is available on the server. If so, the information in the third record enables a comparison of the version number of the upgrade with the version number on the server.

| Record # | mib data | comparison service | string data | numeric data | type |
|---|---|---|---|---|---|
| 1 | cpqHoName | stringcompare | Netware | N/A | applies |
| 2 | cpqSWVerName | stringcompare | NPFC | N/A | applies |
| 3 | cpqSWVer-Version | versioncheck | | | version |

When the upgrade advisor receives all of the comparison results from the comparison services, the results are used, first, to determine whether or not the Novell Programs package is an upgrade which can be installed to the server and, second, to advise the user of the importance of the upgrade. Assuming that an upgrade to the Novell Programs package is both available and desired, the user selects the package as one to be upgraded. The upgrade installer is then invoked.

The upgrade installer retrieves the Novell Program's package from the distribution medium and the corresponding installation instructions from the How_To database. The package and instructions are then incorporated into a job, which includes a command to run the job at midnight. The job, including the Novell Programs package and the control file, is copied into the staging area and the agent on the target server is notified of its presence. When the agent looks at the job, it sees the command to run the job at midnight and waits until that time arrives. At midnight, the agent calls an install application to automatically install the Novell Programs package. When the installation is complete, the agent stores results information, including the name of the job and the time at which it was executed, into the job status table of the MIB. The upgrade installer then retrieves this information and provides it to the user.

Other embodiments of the invention are within the scope of the following claims.

What is claimed is:

1. A method for use in upgrading a resource of a computer from an existing version of the resource to a later version of the resource, comprising digitally storing, on a portable medium, the later version of the resource and upgrade information which
identifies the later version,
describes features of the later version relative to one or more earlier versions of the resource,
identifies the location of the resource on the portable medium,
provides instructions for installation of the resource,
describes reasons for the later version,
indicates the type of change from a prior version to a later version, and
indicates the importance of the change from a prior version to the later version, digitally storing in the computer information identifying the existing version, by computer, automatically determining which of the earlier versions is the existing version, based on the results of the comparing step, automatically determining, or displaying to a user at least some of the upgrade information to aid the user in determining, whether to perform an upgrade, and automatically performing the upgrade.

2. A computer-implemented method for facilitating computer resource updating, the method comprising the steps of:

determining whether an upgrade is available for a computer system resource; and when an upgrade is available for a resource, automatically assembling, by computer, information about whether or not the computer system should be upgraded.

3. The method of claim 2 including the steps of storing information identifying features of a replacement version relative to another version of a resource and storing instructions for automatically installing the replacement version.

4. The method of claim 2 including the step of automatically determining the importance of said upgrade.

5. The method of claim 3 including the step of automatically determining the importance of said replacement version.

6. The method of claim 2 including the step of automatically providing information to the computer system user to determine the importance of the upgrade.

7. The method of claim 2 including the step of automatically installing upgrades of sufficient importance.

8. The method of claim 2 including the step of storing on a storage medium information identifying features of a replacement version relative to another version.

9. The method of claim 8 including the step of storing on said medium, instructions for automatically installing the replacement version.

10. The method of claim 3 including the step of automatically installing upgrades of sufficient importance.

11. The method of claim 8 including the step of automatically installing upgrades of sufficient importance.

12. The method of claim 9 including the step of automatically installing upgrades of sufficient importance.

13. The method of claim 9 including the step of storing on said medium, information about the importance of features of said replacement version relative to another version.

14. The method of claim 2 wherein the computer system comprises a server.

15. The method of claim 2 wherein the step of determining whether an upgrade is available comprises:
    determining which resources are included on the computer system,
    storing information identifying the version of each of the resources; and
    determining if any a replacement is available for any of the resources.

16. A method of providing information about resource replacements for computer systems comprising the steps of
    storing on a storage medium information identifying features of a replacement version relative to another version, and
    storing on a storage medium instructions for automatically installing said replacement version.

17. The method of claim 16 including the step of storing, on said storage medium, information about the importance of said features of said replacement version relative to another version.

18. The method of claim 16 including the step of digitally storing on said storage medium information that identifies the replacement version and describes features of the replacement version relative to other versions.

19. The method of claim 16 including the step of storing on said storage medium at least one copy of a replacement version of a resource.

20. A method for providing information about upgrades for resources on computer systems, the method comprising the steps of:
    transmitting information to a computer for determining by computer whether an upgrade is available for a computer system resource;
    assembling information identifying features of a replacement version of the computer system resource relative to another version; and
    transmitting said information to said computer system to enable said system to assemble information about whether said resource should be upgraded.

21. The method of claim 20 wherein said information is transmitted by telephone lines.

22. The method of claim 20 including the steps of storing information identifying features of a replacement version relative to another version of a resource and storing instructions for automatically installing the replacement version.

23. The method of claim 20 including the step of automatically determining the importance of said upgrade.

24. The method of claim 22 including the step of automatically determining the importance of said replacement version.

25. The method of claim 20 including the step of automatically providing information to the computer system user to determine the importance of the upgrade.

26. The method of claim 20 including the step of automatically installing upgrades of sufficient importance.

27. The method of claim 20 including the step of storing on a storage medium information identifying features of a replacement version relative to another version.

28. The method of claim 27 including the step of storing on said medium, instructions for automatically installing the replacement version.

29. The method of claim 21 including the step of automatically installing upgrades of sufficient importance.

30. The method of claim 27 including the step of automatically installing upgrades of sufficient importance.

31. The method of claim 28 including the step of automatically installing upgrades of sufficient importance.

32. The method of claim 28 including the step of storing on said medium, information about the importance of features of said replacement version relative to another version.

33. The method of claim 20 including the step of transmitting said upgrade to said computer system over the telephone lines.

34. A method for facilitating computer resource updating, the method comprising the steps of:
    determining whether an upgrade is available for a computer system resource;
    when an upgrade is available for a resource, assembling by computer information about whether the computer system should be upgraded; and
    storing on a storage medium information identifying features of a replacement version relative to another version.

35. The method of claim 34 including the step of automatically determining the importance of the replacement version.

36. The method of claim 34 including the step of automatically installing upgrades of sufficient importance.

37. The method of claim 34 including the step of storing instructions for automatically installing the replacement version.

38. A method for facilitating computer resource updating, the method comprising the steps of:
    determining whether an upgrade is available for a computer system resource;
    when an upgrade is available for a resource, assembling by computer information about whether the computer system should be upgraded; and
    automatically determining the importance of the upgrade.

39. The method of claim 38 including the step of automatically installing upgrades of sufficient importance.

40. A method for facilitating computer resource updating, the method comprising the steps of:

determining whether an upgrade is available for a computer system resource;

when an upgrade is available for a resource, assembling, by computer, information about whether the computer system should be upgraded; and automatically providing information to a computer system user to determine the importance of the upgrade.

41. A method for facilitating computer resource updating, the method comprising the steps of:

determining whether an upgrade is available for a computer system resource;

when an upgrade is available for a resource, assembling, by computer, information about whether the computer system should be upgraded; and automatically installing upgrades of sufficient importance.

42. A method for updating a resource at a local computer, the method comprising the steps of:

selecting a resource to be updated at the local computer;

assembling, by computer, information identifying features of a replacement version of the resource relative to another version, saving an old version of the computer resource to a storage medium at the local computer;

coupling the computer to a remote computer; and updating the resource from the old version to a new version by downloading the new version from the remote computer to the local computer.

43. The method of claim 42 and further comprising the step of downgrading the computer resource from the new version back to the old version, the old version being accessed from the storage medium at the local computer.

44. The method of claim 42 and further comprising the step of maintaining information about a plurality of resources available on the local computer.

45. The method of claim 44 wherein the information includes the name and version number of each piece of software on the local computer.

46. The method of claim 42 wherein the new version is downloaded from an on-line service.

47. The method of claim 46 wherein the on-line service comprises a bulletin board service.

48. A method for automatically updating software on a computer, the method comprising the steps of:

maintaining information about each of a plurality of resources within the computer, the information including the name and version number of a plurality of pieces of software;

storing information about an upgrade available for at least one of the plurality of resources;

informing a user of the computer about the availability of the upgrade;

informing the user of the reasons for the upgrade;

providing an option of storing an old version of the resource to a storage medium at the computer;

retrieving the upgrade from a remote location; and installing the upgrade.

49. The method of claim 48 and further comprising the step of allowing the user to decide whether to install the upgrade.

50. The method of claim 48 wherein the step of installing the upgrade is done automatically.

51. The method of claim 48 wherein the step of installing the upgrade is done manually.

52. The method of claim 48 and further comprising the step of determining a time to perform the step of installing the upgrade and then waiting until that time before beginning the step of installing the upgrade.

53. The method of claim 48 wherein the step of retrieving the upgrade from a remote location comprises retrieving the upgrade from an on-line service.

54. The method of claim 53 wherein on-line service comprises a bulletin board service.

55. Computer software for automatically updating software on a computer, the computer software comprising:

a set of computer instructions stored in a software storage medium for maintaining information about each of a plurality of resources within the computer, the information including the name and version number of a plurality of pieces of software;

a set of computer instructions stored in the software storage medium for storing information about an upgrade available for at least one of the plurality of resources;

a set of computer instructions stored in the software storage medium for informing a user of the computer about the availability of the upgrade;

a set of computer instructions stored in the software storage medium for informing the user of the reasons for the upgrade;

a set of computer instructions stored in the software storage medium for optionally storing an old version of the resource to a storage medium at the computer;

a set of computer instructions stored in the software storage medium for retrieving the upgrade from an on-line service; and a set of computer instructions stored in the software storage medium for installing the upgrade.

* * * * *